United States Patent [19]

Quan et al.

[11] 4,333,108
[45] Jun. 1, 1982

[54] APPARATUS AND METHOD FOR TRANSMITTING A PULSE WIDTH MODULATED AUDIO SIGNAL ON A VIDEO SIGNAL

[75] Inventors: Ronald Quan; John O. Ryan, both of Cupertino, Calif.

[73] Assignee: Ampex Corporation, Redwood City, Calif.

[21] Appl. No.: 129,060

[22] Filed: Mar. 10, 1980

[51] Int. Cl.³ .............................................. H04N 7/00
[52] U.S. Cl. ................................................... 358/145
[58] Field of Search .............................. 358/145, 147

[56] References Cited

U.S. PATENT DOCUMENTS 3,466,387 9/1969 Rout ............................... 358/145 X

FOREIGN PATENT DOCUMENTS 1192131 5/1970 United Kingdom ................ 358/145

Primary Examiner—Robert L. Richardson
Attorney, Agent, or Firm—Donald L. Bartels; George B. Almeida; Joel D. Talcott

[57] ABSTRACT

A system for transmitting an audio signal in pulse width modulated form on a video signal is disclosed. The audio signal is modulated by varying the time occurance of at least one edge of a pulse as a function of the voltage level of said audio signal at a selected time. The pulse is then added to the video signal during each horizontal blanking interval. Upon receipt of the transmitted signal, the video signal is processed to reform said edge varying pulse. An output pulse is then generated for each varying edge of said pulse, whose pulse width is a function of the time of occurance of said edge with respect to a stable reference edge. This output pulse is then used to generate a voltage signal whose level is determined by the pulse width of said output pulse. The successively generated voltage levels comprise the reformed audio signal.

15 Claims, 5 Drawing Figures

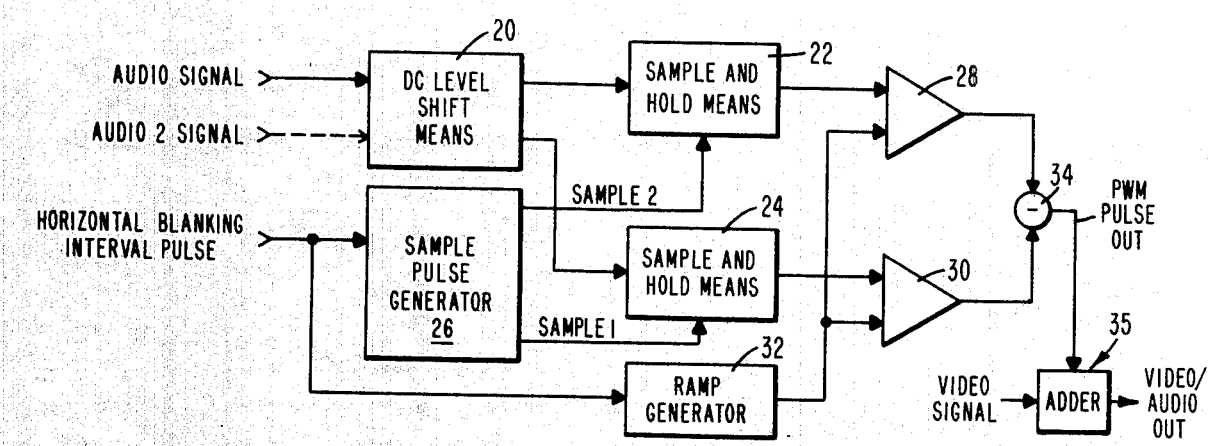
FIG_1
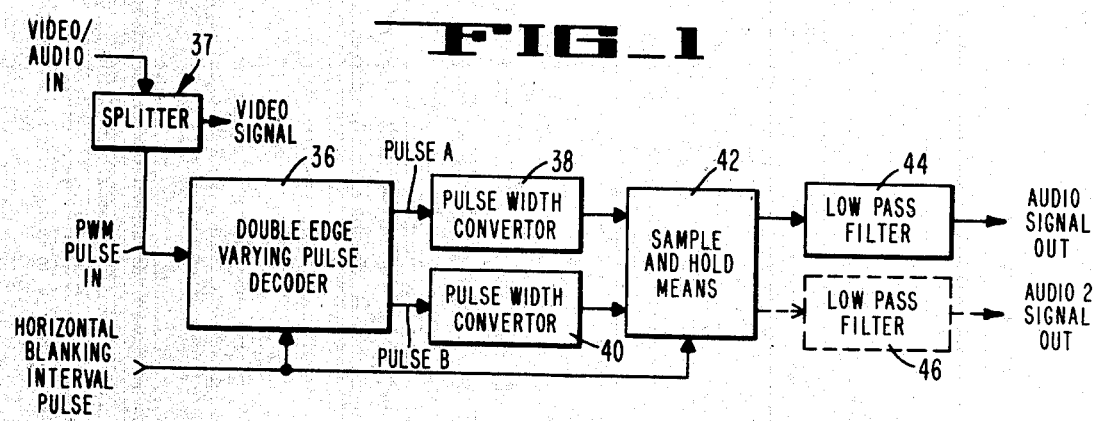
FIG_2
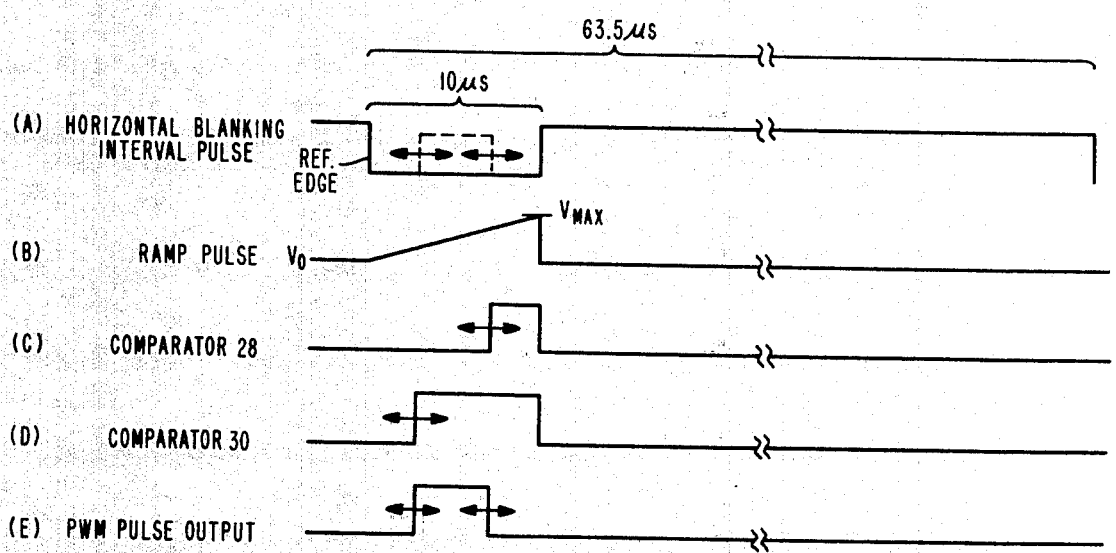
FIG_5

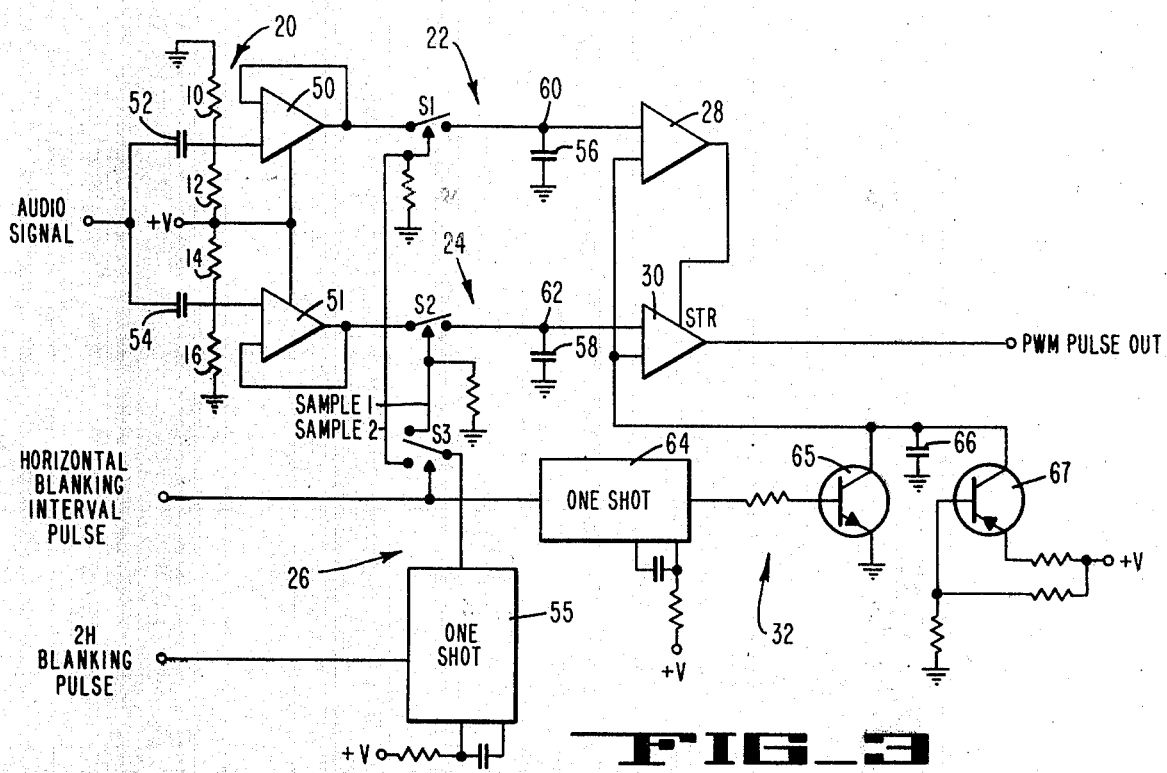
FIG_3
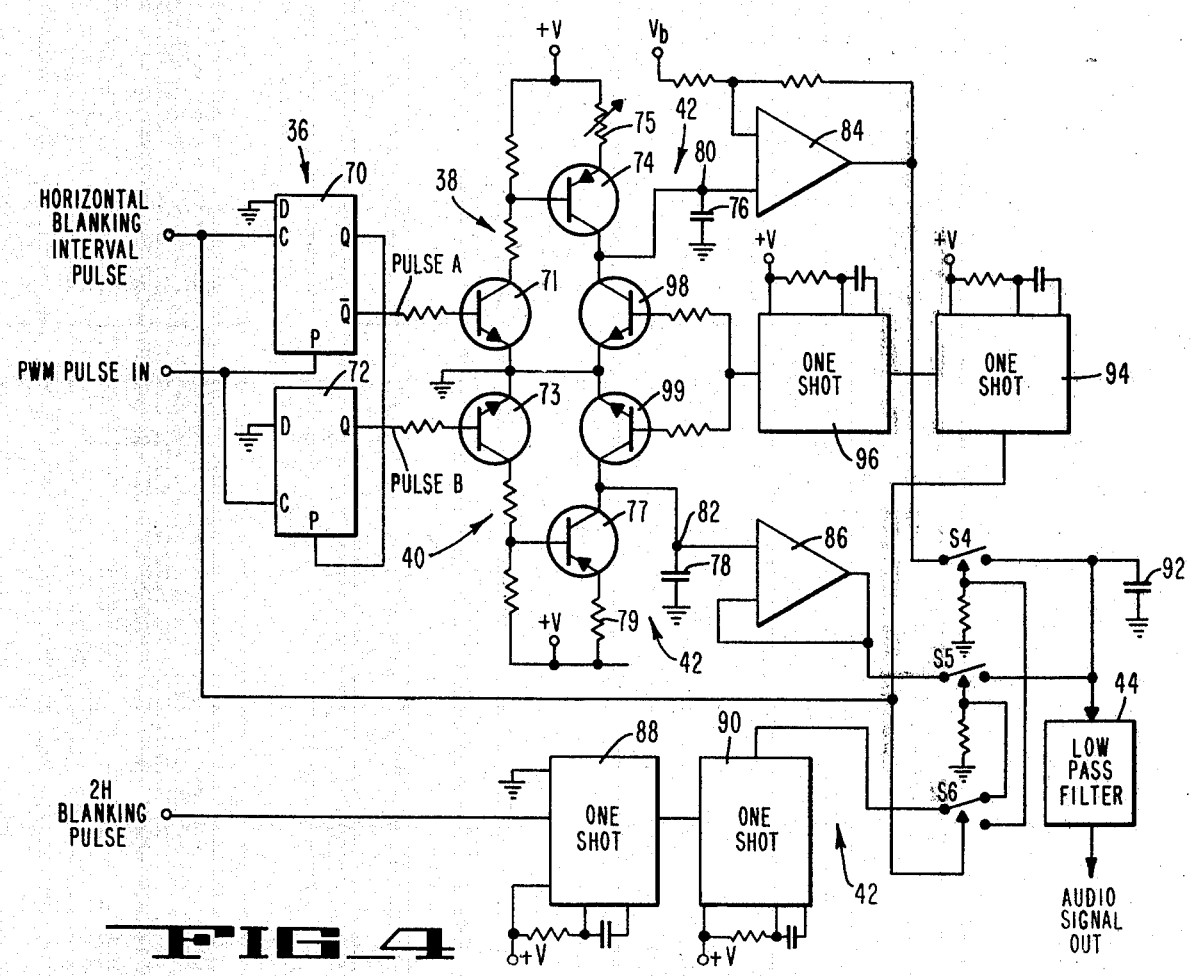
FIG_4

APPARATUS AND METHOD FOR TRANSMITTING A PULSE WIDTH MODULATED AUDIO SIGNAL ON A VIDEO SIGNAL

The present invention relates generally to an apparatus and method for modulating an audio signal onto a video signal during the horizontal blanking interval thereof, and more particularly to a system for the pulse width modulation of such an audio signal onto the video signal, and the subsequent demodulation thereof and reforming of said audio signal at a video receiver means.

Conventional systems have used frequency modulation (FM) techniques to apply an audio signal to a video signal for transmission thereof, e.g., for transmission between a video camera and a base station. One drawback of such system is that the FM carriers within the video channel degrade the frequency response of the video signal, or alternatively, require a large video channel for comparable video signal frequency response. The audio quality, i.e., the signal to noise ratio and the frequency response, is related to this FM carrier bandwidth.

Other modulation methods would include pulse code modulation (PCM) and pulse amplitude modulation (PAM). The difficulty with the PAM modulation is that the audio signal to noise ratio is limited, in this case by the maximum pulse height transmittable on the video signal, and to the sensitivity of resolution of the circuitry to variations in the signal amplitude. The drawback of the PCM approach is that is requires much more complicated and expensive hardware than the other methods. This is due to the fact that synchronization circuits for the various pulses must also be provided in addition to the circuitry common to other methods. This latter drawback is significant in contemporary camera systems wherein size, weight and power consumption are critical parameters in the overall design of the camera.

Size, weight and power consumption are especially significant parameters in portable cameras. Constant attention and effort is directed at decreasing the amount of circuitry in such cameras, and in reducing their size, weight and power consumption, while increasing their levels of performance. Use of the horizontal blanking interval of a video channel for such audio modulation is advantageous, since it eliminates the need for a separate audio channel. The space or time in this interval is "free" for such use due to the fact that the color burst, or other synchronization or calibration signals do not use the entire interval. In a color camera, there are three such video channels, the red, blue and green video channels, each producing a horizontal blanking interval. Consequently, one such interval could be used for transmission of the color burst or other synchronization or calibration signals, leaving two horizontal blanking intervals free for audio modulation use.

In addition, no audio modulation system for video signals is known which takes advantage of the fast rise and fall times available due to the bandwidth of the video signal. In a standard 525 line NTSC video system, the video bandwidth is approximately 5 Mhz at the FM frequencies used for video signal transmission.

Therefore, an object of the present invention is to provide an apparatus and method for modulating an audio signal onto a video signal, wherein the audio signal is pulse width modulated and then added to the video during free time available in the horizontal blanking interval.

Another object of the present invention is to provide an apparatus and method for modulating an audio signal onto a video signal wherein the modulation method takes advantage of the fast rise and fall times obtainable on the video signal.

Yet another object of the present invention is to provide an apparatus and method for modulating an audio signal onto a video signal wherein each edge of a pulse width modulated pulse represents a separate sample of the audio signal, thereby providing an audio signal maximum bandwidth theoretically equal to the frequency of the horizontal blanking interval, i.e., 15.75 kHz.

A further object of the present invention is to provide a means for modulating an audio signal onto a video signal comprising circuitry of simple construction, light weight and small size.

Yet another object of the present invention is to provide an apparatus wherein different audio signals may be modulated on the same video channel, or if a color video system is being used, modulating one audio signal during the horizontal blanking interval of one video channel and modulating a second audio signal on a second video channel.

Still another object of the present invention is to provide for modulating an audio signal onto a video signal wherein the means by which a single pulse is used to convey one channel of wideband audio is inherently insensitive to any low frequency noise or baseline tilt in the video channel.

These and other objects and advantages of the present invention will become apparent upon reference to the following detailed description and the accompanying drawings, in which:

FIG. 1 is a schematic block diagram of a pulse width modulator according to the present invention;

FIG. 2 is a schematic block diagram of a pulse width demodulator according to the present invention;

FIG. 3 is a detailed schematic drawing of the pulse width modulator of FIG. 1; and FIG. 4 is a detailed schematic diagram of the pulse width demodulator of FIG. 2; and FIG. 5 is a timing diagram illustrating the operation of the present invention at various points in the modulator/demodulator circuits shown in FIGS. 3 and 4.

Broadly stated, the present invention is directed to an apparatus and method for pulse width modulating an audio signal onto a video signal, and for the subsequent demodulation thereof at a video receiver. The modulator includes means for periodically sampling and holding said audio signal, means for generating a ramp voltage during the horizontal blanking interval of said video signal, and comparison means for outputting a pulse as a function of the level of said ramp voltage, wherein the pulse width of said pulse is determined by the voltage level of said sampled audio signal. This pulse width is then added onto the video signal. The pulse is subsequently extracted and then demodulated at a video receiver. The audio signal is reformed according to the present invention by feeding this pulse width varying pulse to a means for generating a voltage of a level representative of said pulse width, said means outputting said voltage level until the next pulse is received.

The present invention is directed to a system wherein both the leading and the trailing edges of a pulse width modulated pulse are used for transmission of audio signal voltage levels. This use of a double-sided pulse width modulation allows a single pulse during the horizontal blanking interval to either have an audio signal channel having an effective bandwidth of 15.75 kHz, or two separate audio signal channels each with a bandwidth of 7.875 kHz.

In the embodiment wherein a single pulse width modulated pulse is used to convey one channel of wideband audio (eg, 15.75 kHz), the very means which is employed is inherently insensitive to any low frequency noise, or baseline tilt, in the video channel, as further described below. This inherent, low frequency noise cancelling feature is highly advantageous for high quality audio reception in a video system, since it is normal in video transmission systems for a small amount of power line ripple to be on the received video signal. Further, because the frequency response of the video path rarely extends to D.C., the average picture level changes which gives rise to baseline shifts, and also gives rise to video-to-audio crosstalk.

The 15.75 kHz bandwidth is available for audio signal modulation due to the standard organization of a TV picture, and the video signal used to generate this picture. As is well known, the NTSC requires that there be 525 horizontal lines in each picture frame, and 30 frames per second. Since a horizontal blanking interval is generated for each line, there are 525×30, or 15,750 such intervals per second. Thus, if the audio signal is sampled twice during each line, this results in 31,500 samples per second. By the Nyquist theorem, this provides a bandwidth of 15.75 kHz.

If two audible channels were modulated onto the horizontal blanking interval the leading edge of the modulated pulse would reflect the voltage level of the first audio channel at a given sample time, and the trailing edge would reflect the voltage level of a second audio channel at the same or at a different sample time. A second alternative would be to have more than one modulated pulse during each horizontal blanking interval thereby allowing a wider bandwidth channel (more samples of the audio signal per second) or more audio signal channels.

The present embodiment is directed to a system including a color camera and a video receiver including three separate color video channels transmitted from the camera to the receiver, i.e., the red, green, and blue channels. As seen from the above, this enables up to three 15.75 kHz bandwidth, or six 7.875 kHz bandwidths, audio channels to be available thereon. The present embodiment includes video synchronization data during the horizontal blanking intervals of the blue channel, and modulated audio signals during the horizontal blanking intervals of the red and green channels. Since the red video channel is a lower quality bandwidth channel than the green channel, this channel is preferably used as an audio intercom link between the cameraman and the base station. The green channel, since it is of higher quality, includes in its horizontal blanking interval either a high quality single channel audio signal with a bandwidth of 15.75 kHz, or two lesser quality audio channels, each with bandwidths of 7.875 kHz. Two separate audio channels would be desirable, for example, if stero sound were being transmitted with the video.

The position of an exemplary modulated audio signal during a horizontal blanking interval of a video signal is illustrated in FIG. 5. As seen in FIG. 5A the video signal for a given horizontal line in a 525 NTSC TV system is timed to have a length of 63.5 microseconds. The line begins with a horizontal blanking interval of 10 microseconds. This is conventional in television video signals, wherein the blanking interval is needed for darkening of the picture tube beam during retrace.

An exemplary audio signal is shown in phantom in FIG. 5A as it would appear on the video signal during its horizontal blanking interval. Both the positions of the rising edge and the trailing edge of this pulse vary with respect to the horizontal blanking interval, ie, with respect to a given reference edge, as a function of the detected voltage level of the audio signal at respective sample times. In a preferred embodiment, the first sampled voltage level determines the position of the leading edge in the range of time between 0 and 5 microseconds after the given reference edge (herein referred to as the beginning of the horizontal blanking interval). The second sampled voltage level, regardless of when the sample was actually taken, determines the position of the trailing edge in the range of time between 5 and 10 microseconds after the start of the horizontal blanking interval. Thus, the width of the pulse modulated signal may vary from close to ten microseconds to approximately zero microseconds depending on the amplitude of the two audio signal samples, e.g., if the pulse width were close to zero microseconds, it would be a very thin pulse approximately centered between the ends of the horizontal blanking interval.

In operation, for example, if at a first sample time the audio signal were at a voltage level halfway between its minimum voltage level and its maximum, the pulse leading edge would occur $2\frac{1}{2}$ microseconds after the beginning of the horizontal blanking interval. Similarly, when the audio signal is sampled at a second time, if the audio signal were again at a voltage level halfway between its minimum and its maximum, the trailing edge of the pulse would occur $7\frac{1}{2}$ microseconds after the beginning of the horizontal blanking interval or a $2\frac{1}{2}$ microseconds before its end.

In the preferred embodiment, the first sample time occurs approximately at the same time of occurrence as the horizontal blanking interval during transmission of a given horizontal line video signal, and the second sample time occurs after approximately half of the horizontal line has been transmitted, i.e., approximately 32 microseconds later than the first sample time. In other words, each sample time would be separated by 31.75 microseconds, i.e., there is an equal time interval between successive audio signal samples, with two samples being taken during each horizontal line transmission time of 63.5 microseconds.

Referring now to FIG. 1, there is shown a schematic block diagram of an apparatus embodying the present invention. In the following discussion of this circuit, and the circuits shown in FIGS. 2-4, the operational emphasis will be on the mode of operation described above, wherein a wideband audio signal is sampled twice during the duration of a given video horizontal line, with the leading edge of the pulse width modulated pulse reflecting the first sampled voltage level of said audio signal and the trailing edge reflecting the second sampled voltage level thereof. However, note that the trailing edge of the pulse width modulated pulse could represent a second audio signal, indicated in phantom as the AUDIO 2 signal. Similarly, the circuit could be a more simple approach wherein a portion of the circuit to be described is eliminated in a conventional manner, such that only the leading or the trailing edge of the pulse width modulated pulse varies in response to an audio signal voltage level. Finally, it would be within the skill of the art to modulate more than one pulse width modulated pulse within a given horizontal blanking interval.

As seen in the schematic block diagram of FIG. 1, the AUDIO SIGNAL is input to a DC level shift means 20. The DC level shift means 20 continuously generate two separate DC shifted voltages as a function of the present voltage level of said audio signal, thereby enabling the first samples audio signal voltage level to vary within a first voltage range of $V_0$ to $V_1$, and the second audio signal voltage level to vary within a second range $V_1$ to $V_{max}$. Each of these DC level shifted voltages are sampled and held in respective sample and hold means 22 and 24. Each sample and hold means 22, 24 is separately actuated under the control of respective timing pulses, identified as SAMPLE 1 and SAMPLE 2. These timing pulses are generated by a sample pulse generator 26, which is actuated by the occurrence of each horizontal blanking interval. In the present embodiment, the sample pulse generator 26 generates the SAMPLE 1 pulse when the horizontal blanking interval pulse is received, and generates the SAMPLE 2 pulse approximately halfway between successive horizontal blanking intervals. This enables successive sampling times to occur at approximately equidistant intervals, thereby maximizing the ability to accurately reproduce the audio signal.

The voltage level retained by each sample and hold means 22, 24 is output to respective comparators 28 and 30. The other input to each comparator 28, 30 is a ramp pulse generated by a ramp generator 32. The ramp generator 32 generates a continuously increasing voltage level during the 10 microsecond time of each horizontal blanking interval. An exemplary ramp pulse output by said ramp generator 32 is illustrated in FIG. 5B.

Thus, in operation, as the ramp voltage pulse from the ramp generator 32 increases, assuming the lower level shifted is input to the comparator 30, this ramp pulse first will cause the comparator 30 to go on, since the voltage level of the sample and hold means 24 is between voltage $V_0$ and $V_1$. Similarly, the comparator 28 is caused to go on at a later time as a function of the ramp pulse from the ramp generator 32, since the voltage level out of the sample and hold means 22 would be within the range of $V_1$ to $V_{max}$. Thus, each comparator 28, 30 goes on, generating a leading edge as a function of the voltage level appearing at their respective inputs. Each comparator 28, 30 is biased such that it can go on only during the horizontal blanking interval. Each goes off at the end thereof in response to the going off of said ramp pulse. Thus, as can be seen in FIGS. 5D and 5C, the pulse out of the comparator 30 is longer than the pulse out of the comparator 28, and the pulse width of each such pulse is a direct function of the voltage level of the sample audio signal.

To obtain a single pulse from these two pulses, wherein both the leading edge and the trailing edge vary as a function of respective voltage levels from the two samples of the audio signal, the shorter pulse is subtracted from the longer pulse in a subtractor, as diagrammatically illustrated at 34 in FIG. 1, and as shown in FIG. 5E. Note that in FIG. 5, arrows indicate those pulse edges that vary as a function of the input voltage level.

As will be described in more detail below, the circuit operates to cause the comparator 28 to turn off the comparator 30 when the comparator 28 turns on. This creates a second variable edge at the output of the comparator 30. That is, the circuit acts to subtract out the trailing edges of the pulses generated by both the comparator 28 and the comparator 30. These edges would always occur at the end of the horizontal blanking interval.

Thus, the resultant single pulse comprises the desired double edge varying pulse width modulated pulse. Contemporaneously with its generation, the pulse width modulated (PWM) pulse is added onto the horizontal line video signal of a selected video channel during the horizontal blanking interval thereof via an adder means 35 to provide the composite video/audio output signal.

Referring now to the schematic block diagram of the pulse demodulator shown in FIG. 2, the pulse width modulated pulse is extracted in a video receiver in a conventional manner, for example, by a signal splitter 37, to provide the pulse in the form output by the subtractor 34 shown in FIG. 1. The extracted pulse is fed from the splitter 37 to a decoder 36. This decoder 36 decodes the double varying edge PWM pulse into two separate pulses whose leading edges correspond to the beginning of the horizontal blanking interval, and whose trailing edges vary, respectively, as a function of the position of either the leading or the trailing edge of the PWM pulse with respect to the beginning of the horizontal blanking interval. Each such decoded pulse is output from the decoder 36 as respectively PULSE A and PULSE B.

PULSE A and PULSE B are input to respective pulse width convertors 38 and 40. Each convertor 38 and 40 operates to convert a pulse coupled thereto into a voltage level of an amount depending on the pulse width of said pulse. These voltage levels are output to a sample and hold means 42 which functions to output the voltage level from the converter 38 for one half of the time of occurrence of a given video signal horizontal line, and to output the voltage level from the convertor 40 for a second half of the time of occurrence of said horizontal line. This output voltage level is fed to a conventional low pass filter 44 which operates to smooth out the transitions in this signal caused when the sample and hold means 42 is updated by the next convertor 38 or 40 generated voltage level. The output of the low pass filter 44 comprises the reformed audio signal.

As previously mentioned, the invention combination by which a single pulse width modulated pulse is used to convey one channel of wideband audio, is inherently insensitive to any low frequency noise, or baseline tilt, in the video channel. That is, the output voltage of the pulse width demodulator of FIG. 2 (and 4) is proportional to the sum of the intervals between the start of the horizontal blanking interval (the given reference edge) and the leading edge of the pulse, and between the same reference edge and the trailing edge of the pulse. Therefore, any low frequency additive interference (i.e., low frequency noise or baseline tilt) which would cause one pulse edge to move closer to the reference edge, also causes the other edge to move away from the reference edge by the same amount, and vice versa (assuming symmetrical pulse rise and fall times). Ergo, any low frequency noise or baseline tilt is cancelled by the present system whereby the low frequency additive interference does not give rise to an audio output.

Alternatively, if two audio output channels are desired, e.g., one generated by the voltage level created from the leading edge of the PWM pulse and one channel derived from the voltage level from the trailing edge of the PWM pulse, the sample and hold means 42 may be conventionally modified such that the voltage level from the convertor 40 is separately sampled and held in the sample and hold means 42, and output to a second low pass filter, illustrated in phantom at 46. The output of the low pass filter 46 would comprise the second audio channel, indicated as AUDIO 2 SIGNAL out.

Turning now to FIG. 3, there is disclosed a detailed schematic drawing of the pulse width modulator of FIG. 1. As seen in FIG. 3, the audio signal is DC level shifted by resistors 10 and 12. The resultant voltage level is output to the sample and hold means 22 via an amplifier means 50. Similarly, the input audio signal is DC level shifted by the resistors 14 and 16. The voltage level resultant from this current is fed to the sample and hold means 24 via an amplifier 51. The isolation capacitors 52 and 54 are provided to prevent any DC coupling between their respective resistor networks 10, 12 or 14, 16 and the input audio signal.

In the preferred embodiment shown in FIG. 3, each of the sample and hold means 22 and 24 comprise a circuit composed of respective analog switches, S1 and S2, and respective holding capacitors 56 and 58. Switch S1 is actuated when the SAMPLE 1 pulse is generated by the sample pulse generator 26. Similarly, switch S2 is actuated when the SAMPLE 2 pulse is generated by the generator 26.

This generator 26 includes a third analog switch S3 and a monostable multivibrator or one shot 55. The SAMPLE 1 and SAMPLE 2 pulses are generated as a function of the horizontal blanking interval pulse and as a function of a pulse which occurs twice as often as the horizontal blanking interval pulse, (indicated as the 2H blanking pulse in FIG. 3). The 2H blanking pulse may be generated from the horizontal blanking interval pulse in a conventional manner.

The 2H blanking pulse is input to the one shot 55. The output of the one shot 55 determines the sampling time duration for each of the voltage levels outputted by the DC level shift means 20, i.e., the pulse duration of the SAMPLE 1 and SAMPLE 2 pulses. The state of switch S3 determines whether a SAMPLE 1 pulse or a SAMPLE 2 pulse is generated. As can be seen in FIG. 3, the horizontal blanking interval pulse controls the state of S3.

Thus, in operation, when the horizontal blanking interval pulse is received, switch S3 changes state. Since a 2H blanking pulse is detected at the same time, one shot 55 goes on, thereby generating a SAMPLE 1 pulse, and causing the voltage level applied to switch S1 to be coupled thereacross to the holding capacitor 56. Thereafter, when the horizontal interval pulse goes off, switch S3 switches to its opposite pole, such that when the next 2H blanking pulse is detected, the one shot 55 again goes on, thereby generating a SAMPLE 2 pulse, which causes the voltage level applied to S2 to be coupled thereacross to the holding capacitor 58. Thus, the circuit node shown at 60 represents the output of the sample and hold means 22 and the node 62 represents the output of the sample and hold means 24.

As can be seen, the voltage levels appearing at nodes 60 and 62 are output to respective comparators 28 and 30, as in FIG. 1. As seen in FIG. 3 however, the output of comparator 28 operates to strobe off the output of comparator 30, to provide the subtractor 34 function described above, i.e. the comparator 30 goes on when the level of the voltage out of the ramp generator 32 exceeds the voltage at node 62. The connection of the comparator 28 to the strobe input of the comparator 30, causes it to go off when the comparator 28 goes on. As described above, this occurs when the voltage ramp from the ramp generator 32 equals or exceeds the voltage at the node 60.

The ramp generator 32 generates a ramp voltage pulse in a conventional manner by means of a switch for controlling the coupling of a current source to a capacitor. A one shot 64 is caused to go on for the duration of the horizontal blanking interval. The output of the one shot 64 is fed to the switch, comprising a transistor 65. When the one shot 64 goes on, it causes the transistor 65 to decouple the capacitor 66 from ground. This enables the current source, comprising the transistor-resistor network 67 to feed the capacitor 66, thereby producing the desired ramp. The transistor 65 also ensures that the ramp generator 32 output is off whenever the one shot 64 is off, and further functions to reset the capacitor 66 at the end of the one shot 64 on time.

Referring now to FIG. 4, a detailed schematic diagram of the pulse width demodulator of FIG. 2 is disclosed. As seen in FIG. 4, demodulator timing is generated by a horizontal blanking interval pulse and a pulse which occurs twice as fast, indicated as the 2H blanking pulse. The decoder 36 comprises two flip flops, shown at 70 and 72, each of which function to generate a pulse whose trailing edge reflects the occurrence of, in one case, the leading edge, and in the other case, the trailing edge of the PWM pulse input thereto.

In operation, the flip flop 70 forms a pulse from the beginning of the horizontal blanking interval to the first edge of the inverted PWM pulse. The flip flop 72 forms a pulse from the beginning of the horizontal blanking interval to the second edge of the inverted PWM pulse. Specifically, when the horizontal blanking interval begins, it clocks the flip flop 70 off, since the D input to this flip flop is grounded. The $\overline{Q}$ output of the flip flop 70 is fed to the preset input of the flip flop 72, such that when flip flop 70 goes off it causes flip flop 72 to go on. Since PULSE A is generated from the Q output of the flip flop 70, and PULSE B is generated from the Q output of the flip flop 72, each is therefore turned on at this point.

Thereafter, the PWM is fed to the preset input of the flip flop 70 such that when the inverted pulse width modulated pulse goes low, this flip flop 70 is caused to set its Q output to logic 1 and its $\overline{Q}$ output to 0, thereby causing PULSE A to go off. Similarly, when the pulse width modulated pulse goes back high, this rising edge is seen as a clock pulse by the clock input of the flip flop 72, thereby causing the flip flop 72 to go off. This causes PULSE B to go off.

PULSE A is fed into the pulse width convertor 38. The convertor 38 comprises a transistor 71 which functions to turn on a current source generated by a transistor 74 in combination with a resistor 75. In operation, so long as the $\overline{Q}$ output of the flip flop 70 is on, generating a PULSE A, the current source 74, 75 feeds current to a capacitor 76, forming a ramp voltage, thereby, across the capacitor 76. Similarly, PULSE B is fed to the convertor 40, comprising a transistor 73, which turns on a current source generated by a transistor 77 and resistor 79. In operation, so long as this Q output is on, the current source 77, 79 feeds a second capacitor 78, forming thereby a ramp voltage across the capacitor 78. When PULSE A and PULSE B go off, a voltage is retained across each capacitor 76, 78 of a level representative of the pulse width of these respective pulses.

Consequently, the voltage at a node 80 and the voltage at a node 82 are a function respectively of the pulse width of PULSE A and PULSE B. As described with respect to FIG. 2, these held voltages at the nodes 80 and 82 comprise the retaining portion of the sample and hold means 42. These voltages are fed to respective amplifiers 84 and 86 which couple these voltages to respective sampling analog switches S4 and S5.

Note that resistor 75 is set such that a slightly lower current is fed through the transistor 74 to the capacitor 76, so that the voltage ramp at the node 80 has the same slope as the voltage ramp at the node 82. Similarly, since the pulse width of PULSE A is much less than that of PULSE B, since PULSE A has a maximum width of five microseconds, whereas PULSE B has a pulse width varying between five and ten microseconds, a voltage has to be added to the voltage at the node 80, to ensure that the voltage out of the amplifier 84 is equal to the voltage out of the amplifier 86 for equivalent sampled analog signal voltages detected at the camera. Thus, a voltage $V_b$ is added to the amplifier 84 to provide this additional voltage level shifting.

The sampling function of the sample and hold means 42 is provided by three switches S4, S5, and S6, and two one shots 88 and 90. For timing, besides using the horizontal blanking interval pulse, a second pulse, identified in FIG. 4 as the 2H blanking pulse, is used. This latter pulse is generated, in the same manner as above for the circuit of FIG. 3, such that two pulses occur during each horizontal line, one during the blanking interval, and the other halfway between successive intervals. Switches S4 and S5 are controlled as a function of the state of switch S6. Switch S6 is caused to change state during the horizontal blanking interval. Thus, switch S4 is enabled during this interval and switch S5 is enabled at all other times.

The 2H blanking pulse is fed to the one shot 88 which feeds the one shot 90. One shot 88 functions to delay the actuation of the one shot 90 to prevent sampling of the voltage out of the amplifier 84 until after the horizontal blanking interval has been completed and the voltage ramp on the node 80 has had an opportunity to come up to the level reflecting the pulse width of PULSE A.

One shot 90 turns on only long enough to switch on switch S4, to thereby cause the voltage output from the amplifier 84 to be fed across switch S4 and be reflected on a holding capacitor 92. After the horizontal blanking interval pulse goes away, and switch S6 changes state, it enables the one shot 90 at its next on time to actuate switch S5. Thus, when the next 2H blanking pulse occurs at a point half-way through the horizontal line time, described above as being approximately 31 microseconds later, the one shot 88 again actuates the one shot 90. One shot 90 turns on long enough to enable switch S5, such that the voltage output from the amplifier 86 is fed across switch S5 to update the capacitor 92.

As can be seen, the voltage across the capacitor 92 is fed to the low pass filter 44, for outputting therefrom the reformed audio signal, as described above with respect to FIG. 2.

Means are also provided for resetting the capacitors 76 and 78, to enable them to start from 0 volts for the next respective voltage ramps generated by the next PULSE A and PULSE B. This operation occurs near the end of the horizontal line time, just prior to the receipt of the next horizontal blanking interval pulse. Specifically, the horizontal blanking interval pulse actuates a one shot 94, which remains on for almost the entire interval between horizontal blanking interval pulses. When the one shot 94 goes off, it actuates the one shot 96. One shot 96 simultaneously actuates transistors 98 and 99 which operate to switch the capacitors 76 and 78 to ground. One shot 96 only remains on long enough to ensure that capacitors 76 and 78 have been completely discharged.

It is of course understood that although preferred embodiments of the present invention have been illustrated and described, various modifications, alternatives and equivalents thereof will become apparent to those skilled in the art and, accordingly, the scope of the present invention should be defined only by the appended claims and equivalents thereof.

What is claimed is:

1. A system for transmitting an audio signal in pulse modulated form on a video signal during a horizontal blanking interval thereof, comprising:
   means for periodically generating an output pulse whose leading edge varies in time with respect to a reference edge of said horizontal blanking interval as a function of the voltage level of said audio signal at a first point in time, and whose trailing edge varies in time with respect to a reference edge of said horizontal blanking interval as a function of the voltage level of said audio signal at a second point in time; and
   means for adding said output pulse to the video signal during said horizontal blanking interval.

2. The system of claim 1 further comprising;
   means for extracting the reformed output pulse from the video signal; and
   means for demodulating the extracted pulse to provide voltage levels representative of the time of the leading and trailing edges of the pulse with respect to the horizontal blanking interval reference edge, which voltage levels represent the reconstituted audio signal.

3. The system of claim 2 wherein low frequency noise and baseline tilt are present and the output pulse rise and fall times are substantially symmetrical and wherein the leading and trailing edges of the pulse vary inversely in their time of occurrences with respect to the horizontal blanking interval, said system further comprising means for cancelling out the effects of the noise and baseline tilt on said output pulse.

4. A system for transmitting an audio signal in pulse width modulated form on a video signal during a horizontal blanking interval thereof, comprising:
   means for generating a first DC level shifted signal from said audio signal;
   means for generating a second DC level shifted signal from said audio signal;
   first means for sampling and retaining said first DC level shifted voltage signal at one point in time;
   means for sampling and retaining the second DC level shifted voltage signal at a second point in time;
   means for generating a ramp voltage during said horizontal blanking interval;
   first comparator means for generating a first output pulse when said ramp voltage is equal to or greater than said first retained DC level shifted voltage signal;
   second comparator means for generating a second output pulse when said ramp voltage is equal to or greater than said second retained DC level shifted voltage signal;

means for causing the termination of said first output pulse upon the generation of said second output pulse to define an output pulse; and means for adding the output pulse to said video signal, during said horizontal blanking interval.

5. The system of claim 1 or 4 further comprising:

means at a video signal receiver for extracting said output pulse from said video signal during the blanking interval;

means for generating a first pulse whose pulse width is a function of the time of occurrence of one edge of the extracted output pulse with respect to the horizontal blanking interval;

means for generating a second pulse whose pulse width is a function of the time of occurrence of the other edge of the extracted output pulse with respect to said horizontal blanking interval; and means responsive to the pulse width of each of said first and second pulses for outputting respective first and second voltage levels, said first voltage level being output for a first duration of time, said second voltage level being output for a second duration of time of a length such that the total time duration of said first and second voltage levels continues until a next extracted output pulse is demodulated.

6. The system of claim 1 or 4 further comprising:

means at a video signal receiver for extracting said output pulse from said video signal during each blanking interval;

means for generating a first pulse whose width is a function of the time of occurrence of one edge of the extracted output pulse with respect to said horizontal blanking interval;

means for generating a second pulse whose pulse width is a function of the time of occurrence of the other edge of the extracted output pulse with respect to said horizontal blanking interval;

means for generating a first voltage of a level representative of the pulse width of said first pulse;

means for generating a second voltage of a level representative of the pulse width of said second pulse;

means for DC level shifting said first voltage level such that it is referenced to the same zero level as said second voltage level;

means for outputting said DC level shifted first voltage level for a first duration of time; and means for outputting said second votlage level for a second duration of time of a length such that the total duration of said first and second voltage levels continues until a next extracted output pulse is demodulated.

7. The system of claim 6 further comprising low pass filter means for filtering out the high frequency components of said output voltage levels.

8. A system for transmitting first and second audio signals in a pulse modulated form on a video signal during a horizontal blanking interval thereof, comprising:

means for generating a pulse, whose leading edge varies in time with respect to a reference edge of said horizontal blanking interval as a function of the voltage level of said first audio signal at a point in time during the interval between the start of a first horizontal blanking interval and the start of the next succeeding interval and whose trailing edge varies in time with respect to a reference edge of said horizontal blanking interval as a function of the voltage level of said second audio signal at a point in time during the interval between the start of the first horizontal blanking interval and the start of the next succeeding interval; and means for adding the pulse to said video signal during said horizontal blanking interval.

9. The system of claim 8 further comprising:

means for generating a second pulse, one of whose edges varies in time with respect to a reference edge of said horizontal blanking interval as a function of the voltage level of said first audio signal at a second point in time during the interval between the start of a first horizontal blanking interval and the start of the next succeeding interval; and means for adding said second pulse to the video signal during said horizontal blanking interval.

10. In a system having a plurality of simultaneously transmitted video channels, an apparatus for transmitting a first audio signal in pulse modulated form on a first such video channel during a horizontal blanking interval thereof, and transmitting a second audio signal in pulse modulated form on a second said video channel during a corresponding horizontal blanking interval thereof, comprising:

means for generating a first pulse, at least one of whose edges varies in time with respect to a reference edge of said horizontal blanking interval as a function of the voltage level of said first audio signal at a point in time during the interval between the start of a first horizontal blanking interval and the start of the next succeeding horizontal interval;

means for adding the first pulse to said first video channel during said horizontal blanking interval;

means for generating a second pulse, at least one of whose edges varies in time with respect to a reference edge of said horizontal blanking interval as a function of the voltage level of said audio signal at a point in time during the interval between the start of such first horizontal blanking interval and the start of said next horizontal interval; and means for adding the second pulse to said second video channel during said corresponding horizontal blanking interval.

11. A method for adding a pulse modulated audio signal onto a video signal during a horizontal blanking interval thereof, comprising the steps of:

(a) sampling the voltage level of said audio signal during the interval between the start of one horizontal blanking interval and the start of the next succeeding such interval;

(b) generating a pulse, one edge of which varies in time with respect to a reference edge of said horizontal blanking interval as a function of said audio signal sampled voltage level; and (c) adding the pulse to said video signal during said horizontal blanking interval.

12. The method of claim 11 further comprising the steps of:

(d) extracting the pulse from the video signal;

(e) generating a voltage level representative of the time of occurrence of the varied edge of the pulse with respect to said reference edge of said horizontal blanking interval; and (f) outputting consecutive voltage levels representative of consecutive extracted pulses to reconstitute the audio signal.

13. The method of claim 1 wherein low frequency noise and baseline tilt are present, wherein the step of generating a pair of voltage levels includes, causing the leading and trailing edge of the pulse to vary inversely in time of occurrence with respect to the horizontal blanking interval which cancels the effects of the noise and baseline tilt.

14. A method for modulating an audio signal onto a video signal during a horizontal blanking interval thereof, comprising the steps of:
 (a) sampling said audio signal at a first point in time in the period between the start of one horizontal blanking interval and the start of the next succeeding such interval, and generating a first DC level shifted signal therefrom;
 (b) sampling said audio signal at a second point in time during the period between the start of one horizontal blanking interval and the start of the next succeeding such interval, and generating a second DC level shifted signal therefrom;
 (c) generating a ramp voltage during the horizontal blanking interval;
 (d) comparing said ramp voltage with said first DC level shifted signal and generating a first output pulse when said ramp voltage is equal to or greater than said first DC level shifted signal;
 (e) comparing said ramp voltage with said second DC level shifted signal and generating a signal output pulse when said ramp voltage is equal to or greater than said second DC level shifted signal;
 (f) causing the termination of said first output pulse upon the generation of said second output pulse; and
 (g) adding the terminated first output pulse to said video signal during said horizontal blanking interval.

15. The method of claim 14 further comprising the steps of:
 (a) extracting said terminated first output pulse from said video signal to define a reformed output pulse from each blanking interval;
 (b) generating a first pulse whose pulse width is a function of the time of occurrence of one edge of said reformed output pulse with respect to such horizontal blanking interval;
 (c) generating a second pulse whose pulse width is a function of the time of occurrence of the other edge of said reformed output pulse with respect to such horizontal blanking interval; and
 (d) outputting a first voltage level as a function of the pulse width of said first pulse for a first duration of time, and outputting a second voltage level responsive to the pulse width of said second pulse for a second duration of time, each time duration of a length such that the total time duration of said first and second voltage levels continues until a next output pulse is extracted and reformed.

* * * * *